C. M. Cornell.
Grain Drill.
Nº 92,171.                    Patented Jul. 6, 1869.

Witnesses:
Jas. W. Bauer
Edmund Masson

Inventor:
C. M. Cornell
By atty A. B. Stoughton

United States Patent Office.

CHARLES M. CORNELL, OF IONIA, MICHIGAN.

Letters Patent No. 92,171, dated July 6, 1869.

IMPROVEMENT IN COMBINED SEED-PLANTER, DROPPER, AND CULTIVATOR.

The Schedule referred to in these Letters Patent and making part of the same.

*To all whom it may concern:*

Be it known that I, CHARLES M. CORNELL, of Ionia, in the county of Ionia, and State of Michigan, have invented certain new and useful Improvements in Combined Seed-Planters, or Droppers, and Cultivators; and that the following is a full, clear, and exact description of the construction and operation of the same, reference being had to the accompanying drawings, making a part of this specification, in which—

Similar letters of reference, where they occur in the separate figures, denote like parts of the machine in all of the drawings.

Figure 1:
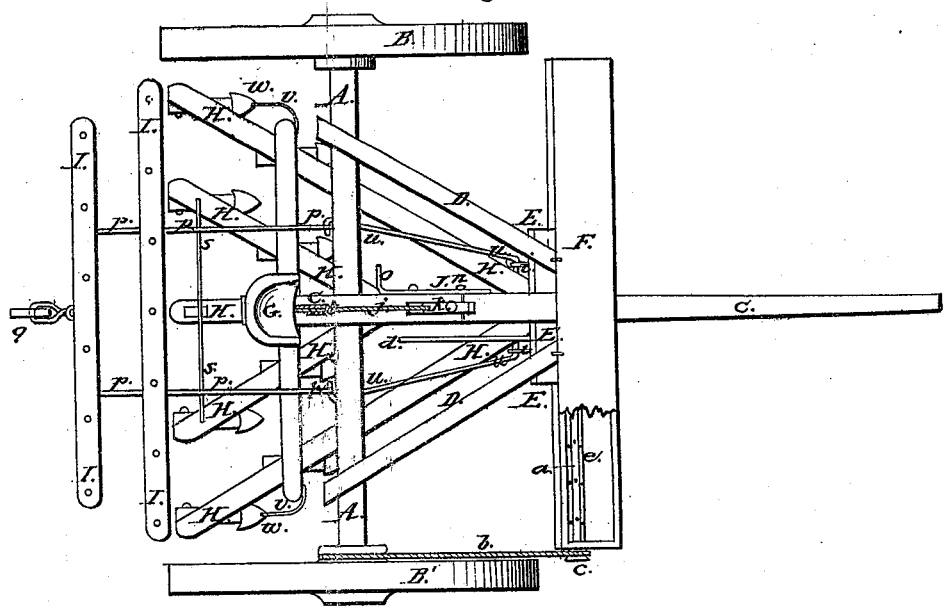
Figure 1 is a top plan of the machine, with a portion of the cover of the seed-box represented as broken away, to show the interior thereof.
Figure 2:
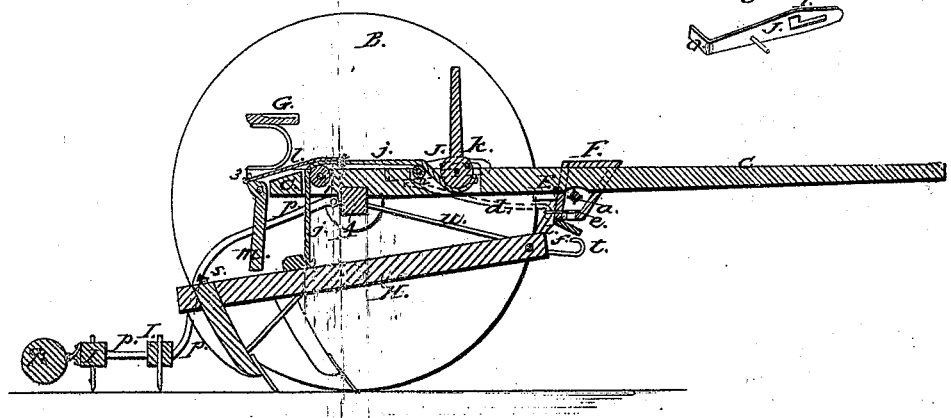
Figure 2 represents a longitudinal vertical section through the machine.

My invention relates to a combined machine for sowing or dropping seed, and for cultivating, or plowing and harrowing the soil, all capable of being carried and controlled on one and the same pair of main wheels, while the frames of each have motions independent of each other, but all under the easy control of the operator, who can use them singly or jointly, as he may desire.

To enable others skilled in the art to make and use my invention, I will proceed to describe the same, with reference to the drawings.

The main axle A is supported on a pair of carrying wheels, B B'.

The tongue C is fastened to the axle A, and is braced and strengthened by the hound-braces D D, also fastened to the axle and to the tongue, and the three pieces further united, just in rear of the union of the hounds and tongue or pole, by a cross-brace, E, which affords greater facilities for there locating and securing the seed-hopper, or box F.

The axle, tongue, hounds, and cross-brace, all being directly or indirectly secured together, may be termed the main frame of the machine, and which main frame carries and supports the driver in his seat G, which is on the rear projecting end of the pole, the seed-hopper, or box F, and the plow and harrow-frames H I, which latter will be hereafter described.

Longitudinally through the hopper F passes a stirrer, a, which is turned by a belt, or band, b, passing around the hub of the carrying-wheel B', and around a pulley, c, on the projecting end of said stirrer-shaft.

In the bottom of the hopper there is a sliding plate, e, furnished with a series of holes, which plate can be moved in the hopper by means of a lever, d, connected therewith, and projecting rearward into convenient reach of the driver in his seat.

Underneath this plate e is the bottom proper of the hopper, which also has a series of holes through it, which the sliding plate, with its holes, may be made to close or disclose, or partially so, either to stop off, let on, or regulate the seed-dropping, or sowing.

Underneath the bottom of the hopper is a scattering-board, f, which inclines downward, and which may have grooves therein, radiating from a point where each of the holes in the bottom of the hopper drops the grain through, by which board and grooves the grain is evenly and uniformly distributed upon the ground, as in broadcast sowing.

The plow-frame H, which is of a double V-form, is suspended at its front end to the main frame, by links or rods i, and its after-portion is suspended to said main frame by a cord, or chain, j, which, after passing over friction-pulleys 1, 2, in the pole or main frame, is then fastened to an arc-lever, k, also pivoted to the main frame.

To the cord, or chain j, there is fastened a second cord, or chain, l, which is attached to the arm 3 of a pivoted foot, or brace, m, so that whenever the arc-lever k is actuated to raise or lower the plow-frame, the foot, or brace m shall be also actuated thereby, so as to allow the plow-frame to rise, and when it is lowered, to hold it against rising.

Figure 3:
Figure 3 represents in perspective, and detached from the machine, a locking-lever, not clearly seen in the other figures of the drawings.

On the side of the tongue, there is pivoted a locking-lever, J, fig 3, which has an angular, or L-shaped slot in it, into which slot a pin, n, on the arc-lever k, projects; and upon the lock-lever there is a bent arm, o, for the driver to put his foot upon or against, when he desires to lower the plow-frame upon the ground.

When the driver desires to raise the plow-frame, he draws the handle of the arc-lever toward himself. This motion first swings the foot-brace m backward and upward, without which said frame could not rise; and by continuing to draw the lever toward himself, the pin n, in the arc, takes into the angular portion i of the slot, and there holds, locking the lever and the plow-frame in its elevated position.

If the driver wants to lower said frame again, he presses upon the arm o of the lock-lever, which clears the pin n of the notch r, and when clear of that, the weight of the frame causes it to descend.

The harrow-frame I is linked to the main frame (or the main axle, which, as before stated, constitutes a part of the main frame) by means of the bent rods or links p p, and said frame may have a ground-wheel, q, to prevent it from dragging too heavy or allowing the harrow-teeth to sink too deep into the soil.

The harrow-frame is, however, supported on the plow-frame H by means of its arms, or links p p dropping and resting upon the cross-rod s of said plow-frame, so that the arc-lever raises the foot-brace m, the plow-frame H, and the harrow-frame I, and can be made to hold them up; or the driver may simply raise them to pass over some intervening obstacle, and then let them down again.

I do not describe the kind of plows used in the frame H, nor the kind of harrow-teeth used in the frame I, because any of the well-known forms for such purposes may be used at pleasure.

The team is hitched to, and the machine drawn by the hook, or clevis, at t, which is united to the plow-frame, which makes the greatest resistance to the draught; and stay or drag-rods u also connect with the draught and with the axle A; or they may pass through the axle, and afford a connection directly with the harrow-frame links; or bars p p, so that every resisting part of the machine may be directly connected with the draught of the team.

From the outside teeth w w of the plow-frame, and from the points, or lowest and most projecting portions thereof, pieces v v extend to, and are fastened on to said frame. These pieces serve as guards, or fenders when the machine is used in stumpy ground.

Having thus fully described my invention, and shown how the same is operated,

What I claim therein as new, and desire to secure by Letters Patent, is—

The arrangement of the two frames H I, and their independently-hinged connection with the main frame, so that the raising and lowering of the frame H may correspondingly raise and lower the frame I, as described and represented, and for the purpose described.

Also, in combination with the main frame and the plow-frame, the lever k, cords or chains j l, and pivoted foot-brace m, for the purpose of raising and lowering the plow and harrow-frames, or holding them down, as herein described and represented.

Also, in combination with the main frame and the plow and harrow-frames, the lever, cords, and brace, with a locking-lever, J, arranged to act in connection with the raising-lever k, as and for the purpose herein described and represented.

Also, in combination with a main frame and with a plow and harrow-frame, arranged and operating as herein described, a seed-hopper, or box, and seeding-mechanism connected thereto, and operating as herein stated, so that seed-sowing, cultivating, or harrowing may be done by one and the same machine, as set forth.

Also, in combination with the outer teeth w, the guards, or fenders v, extending from the lower parts of said teeth up, and connected to the frame, substantially as and for the purpose described.

CHARLES M. CORNELL.

Witnesses:
DAVID B. SOULE,
C. O. THOMPSON.